(12) United States Patent
Zhu et al.

(10) Patent No.: US 12,068,509 B2
(45) Date of Patent: Aug. 20, 2024

(54) BULK METALLIC GLASS INTERCONNECT FOR HIGH POWER DENSITY FUEL CELL

(71) Applicant: Hamilton Sundstrand Corporation, Charlotte, NC (US)

(72) Inventors: Tianli Zhu, Glastonbury, CT (US); Paul Sheedy, Bolton, CT (US); John A. Sharon, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 139 days.

(21) Appl. No.: 17/235,060

(22) Filed: Apr. 20, 2021

(65) Prior Publication Data

US 2021/0328233 A1    Oct. 21, 2021

Related U.S. Application Data

(60) Provisional application No. 63/012,979, filed on Apr. 21, 2020.

(51) Int. Cl.
*H01M 8/0232* (2016.01)

(52) U.S. Cl.
CPC ................. *H01M 8/0232* (2013.01)

(58) Field of Classification Search
CPC .................................................. H01M 8/0232
See application file for complete search history.

(56) References Cited

U.S. PATENT DOCUMENTS

| | | | |
|---|---|---|---|
| 7,906,219 B2 | 3/2011 | Ohara et al. | |
| 8,070,891 B2 | 12/2011 | Fleury et al. | |
| 8,927,176 B2 | 1/2015 | Wende | |
| 2015/0263372 A1* | 9/2015 | Choi | H01M 8/0273 429/465 |
| 2016/0177430 A1 | 6/2016 | Shin et al. | |

(Continued)

FOREIGN PATENT DOCUMENTS

| | | | |
|---|---|---|---|
| CN | 102364738 B | 5/2013 | |
| EP | 3442064 A1 * | 2/2019 | .......... H01M 8/0232 |

(Continued)

OTHER PUBLICATIONS

English machine translation of Amiya et al. (JP 2007066817 A) (Year: 2007).*

(Continued)

*Primary Examiner* — Brian R Ohara
(74) *Attorney, Agent, or Firm* — CANTOR COLBURN LLP

(57) ABSTRACT

A solid oxide fuel cell or solid oxide electrolyzer includes a plurality of fuel cell layers stacked along a stacking axis. Each fuel cell layer including a stacked arrangement of elements including a cathode, an anode, an electrolyte located between the anode and the cathode, a support layer positioned at the anode opposite the electrolyte, and a separator plate located at the support layer opposite the anode. The separator plate is configured to contact the cathode of an adjacent fuel cell layer of the plurality of fuel cell layers. The separator plate defines a plurality of anode flow channels configured to deliver a fuel therethrough and a plurality of cathode flow channels configured to deliver an air flow therethrough. The separator plate is formed from a bulk metallic glass material.

18 Claims, 6 Drawing Sheets

(56) References Cited

U.S. PATENT DOCUMENTS

2019/0372132 A1    12/2019    Gasda et al.
2020/0036036 A1      1/2020    Mihara et al.

FOREIGN PATENT DOCUMENTS

| EP | 3442064 A1 | | 2/2019 | |
|----|------------|---|--------|---|
| JP | 2007066817 A | * | 3/2007 | |
| WO | WO-2005056858 A1 | * | 6/2005 | ........... C22C 45/001 |
| WO | WO-2006059402 A1 | * | 6/2006 | .......... H01M 8/0236 |

OTHER PUBLICATIONS

European Search Report for European Application No. 21169644.8; dated Oct. 4, 2021; 34 pages.
Pang et al.; Effects of Chromium on the Glass Formation and Corrosion Behavior of Bulk Glassy Fe—CR—Mo—C—B Alloys; Materials Transactions, 2002, 6 pages.
Pang et al.; Synthesis of Fe—Cr—Mo—C—B—P bulk metallic glasses with high corrosion resistance; Acta Materialia; 2001, 9 pages.
Yanhui Li, et al.; New FeNiCrMo(P, C, B) gigh-entropy bulk metallic glasses with unusual thermal stability and corrosion resistance; Yanhui Li, et al.; Journal of Materials Science and Technology; 2020; 8 pages.

* cited by examiner

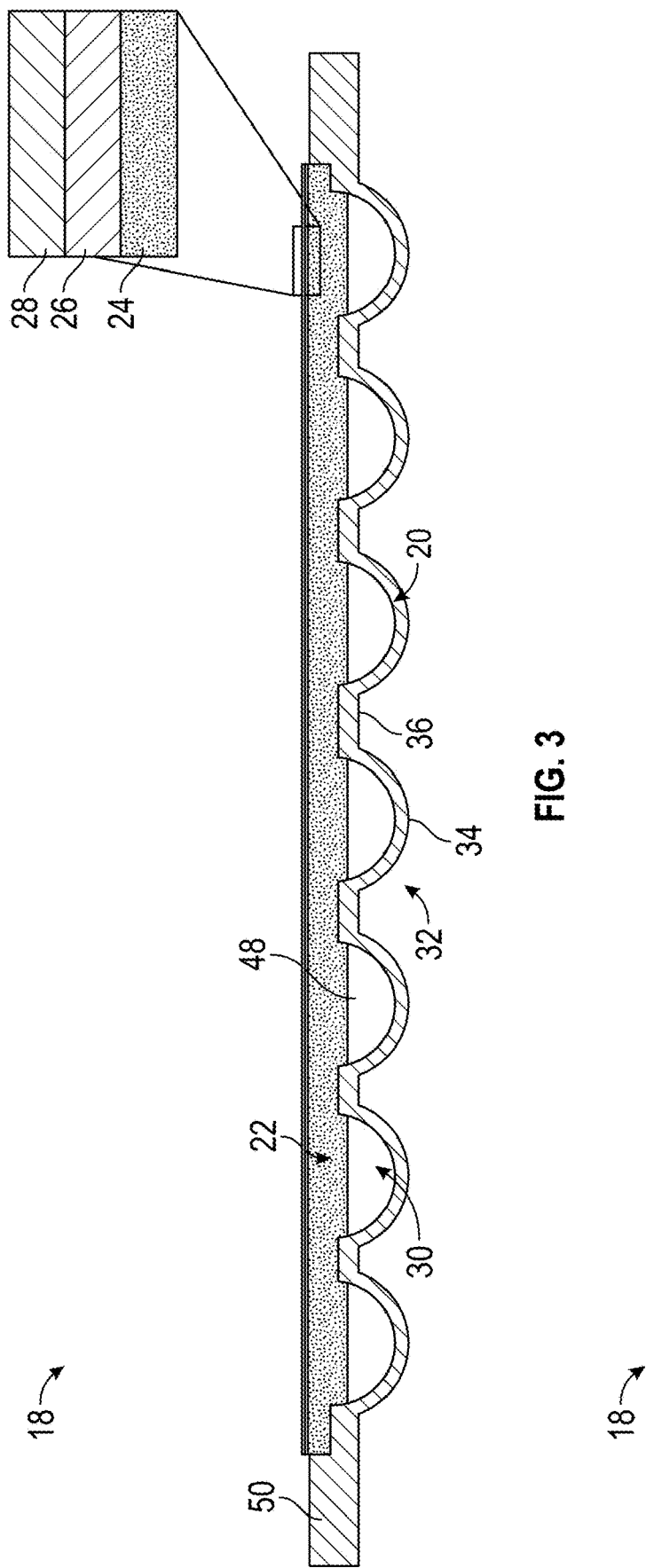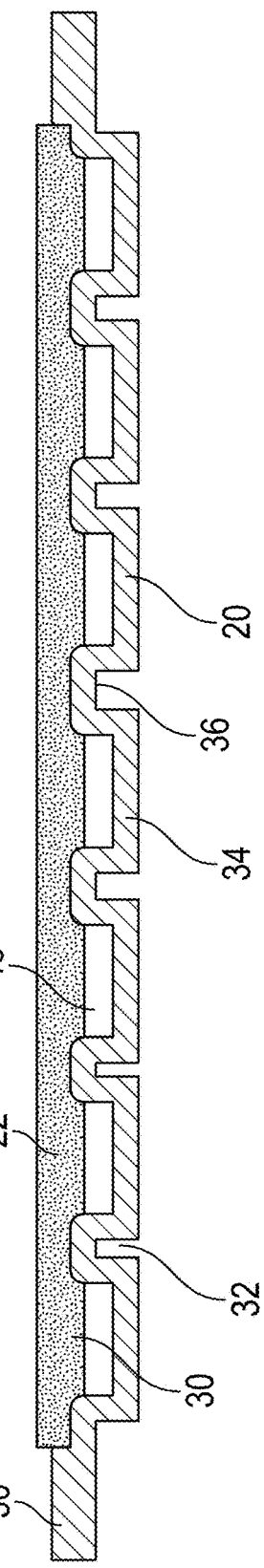

BULK METALLIC GLASS INTERCONNECT FOR HIGH POWER DENSITY FUEL CELL

CROSS-REFERENCE TO RELATED APPLICATIONS

This application claims the benefit of U.S. Provisional Application No. 63/012,979 filed Apr. 21, 2020, the disclosure of which is incorporated herein by reference in its entirety.

BACKGROUND

Exemplary embodiments pertain to the art of fuel cells, and in particular to fuel cell configurations having high power density for use in, for example, aircraft applications.

The increased use of electrical power in aircraft systems and propulsion requires advanced electrical storage systems and/or a chemical to electrical power conversion system to generate adequate amounts of electrical power. Both high system efficiency and high power density of the conversion system are required.

Fuel cell based power systems, such as solid oxide fuel cell (SOFC) based power systems, are able to achieve electrical efficiencies of 60% or greater. Further, SOFC power systems can operate with a variety of fuels and are scalable to achieve different power levels. Current, state of the art SOFC systems, however, have relatively low power densities of less than about 500 watts per kilogram, and relatively slow startup times typically exceeding 30 minutes. For aircraft and aerospace applications, increased power densities and reduced startup times are required.

BRIEF DESCRIPTION

In one embodiment, a solid oxide fuel cell or solid oxide electrolyzer includes a plurality of fuel cell layers stacked along a stacking axis. Each fuel cell layer including a stacked arrangement of elements including a cathode, an anode, an electrolyte located between the anode and the cathode, a support layer positioned at the anode opposite the electrolyte, and a separator plate located at the support layer opposite the anode. The separator plate is configured to contact the cathode of an adjacent fuel cell layer of the plurality of fuel cell layers. The separator plate defines a plurality of anode flow channels configured to deliver a fuel therethrough and a plurality of cathode flow channels configured to deliver an air flow therethrough. The separator plate is formed from a bulk metallic glass material.

Additionally or alternatively, in this or other embodiments an electrical conductivity of the separator is attained via crystallization of the bulk metallic glass material.

Additionally or alternatively, in this or other embodiments the bulk metallic glass material is corrosion resistant.

Additionally or alternatively, in this or other embodiments the separator plate includes a coating applied to the bulk metallic glass material.

Additionally or alternatively, in this or other embodiments the plurality of anode flow channels at least partially overlap the plurality of cathode flow channels along the stacking axis.

Additionally or alternatively, in this or other embodiments the electrolyte is formed from a solid oxide material.

Additionally or alternatively, in this or other embodiments the separator plate defines the plurality of anode flow channels at a first side of the separator plate and the plurality of cathode flow channels at a second side of the separator plate opposite the first side.

Additionally or alternatively, in this or other embodiments the bulk metallic glass material is one or more of a Fe—Cr—Mo—C—B based bulk metallic glass material, a Zr based bulk metallic glass material, or a bulk metallic glass composite material.

In another embodiment, a fuel cell layer of a multi-layer fuel cell includes a cathode, an anode, an electrolyte located between the anode and the cathode, a support layer positioned at the anode opposite the electrolyte, and a separator plate positioned at the support layer opposite the anode. The separator plate is configured to contact the cathode of an adjacent fuel cell layer. The separator plate defines a plurality of anode flow channels configured to deliver a fuel therethrough and a plurality of cathode flow channels configured to deliver an air flow therethrough. The separator plate is formed from a bulk metallic glass material.

Additionally or alternatively, in this or other embodiments an electrical conductivity of the separator is attained via crystallization of the bulk metallic glass material.

Additionally or alternatively, in this or other embodiments the bulk metallic glass material is corrosion resistant.

Additionally or alternatively, in this or other embodiments the separator plate includes a coating applied to the bulk metallic glass material.

Additionally or alternatively, in this or other embodiments the plurality of anode flow channels at least partially overlap the plurality of cathode flow channels along the stacking axis.

Additionally or alternatively, in this or other embodiments the separator plate defines the plurality of anode flow channels at a first side of the separator plate and the plurality of cathode flow channels at a second side of the separator plate opposite the first side.

Additionally or alternatively, in this or other embodiments the separator plate includes a plurality of curved portions separated by flat support portions, with the support portions interfacing with the support layer and curved portions 34 contacting the cathode of the adjacent fuel cell layer.

Additionally or alternatively, in this or other embodiments the bulk metallic glass material is one or more of a Fe—Cr—Mo—C—B based bulk metallic glass material, a Zr based bulk metallic glass material, or a bulk metallic glass composite material.

In yet another embodiment, a method of assembling a multi-layer fuel cell includes assembling a plurality of fuel cell layers, each fuel cell layer including a cathode, an anode, an electrolyte located between the anode and the cathode, a support layer positioned at the anode opposite the electrolyte, and a separator plate positioned at the support layer opposite the anode. The separator plate is configured to contact the cathode of an adjacent fuel cell layer. The separator plate defines a plurality of anode flow channels configured to deliver a fuel therethrough and a plurality of cathode flow channels configured to deliver an air flow therethrough. The separator plate is formed from a bulk metallic glass material. The plurality of fuel cell layers are arranged along a stacking axis, the separator plate is heated to a temperature greater than a glass transition temperature of the bulk metallic glass material, a compressive load is applied to the plurality of fuel cell layers, and the bulk metallic glass material is thermoplastically flowed thereby increasing a contact area of the separator plate to the cathode of the adjacent fuel cell layer.

Additionally or alternatively, in this or other embodiments the bulk metallic glass material is one of a Fe—Cr—Mo—C—B based bulk metallic glass material, a Zr based bulk metallic glass material, or a bulk metallic glass composite.

Additionally or alternatively, in this or other embodiments the glass transition temperature is below 600 degrees Celsius.

Additionally or alternatively, in this or other embodiments thermoplastic flow of the bulk metallic glass material improves a contact area between the separator plate and the support layer.

BRIEF DESCRIPTION OF THE DRAWINGS

The following descriptions should not be considered limiting in any way. With reference to the accompanying drawings, like elements are numbered alike:

FIG. 3 is a schematic illustration of an embodiment of a fuel cell layer;

FIG. 4 is another schematic illustration of an embodiment of a fuel cell layer;

DETAILED DESCRIPTION

A detailed description of one or more embodiments of the disclosed apparatus and method are presented herein by way of exemplification and not limitation with reference to the Figures.

Figure 1:
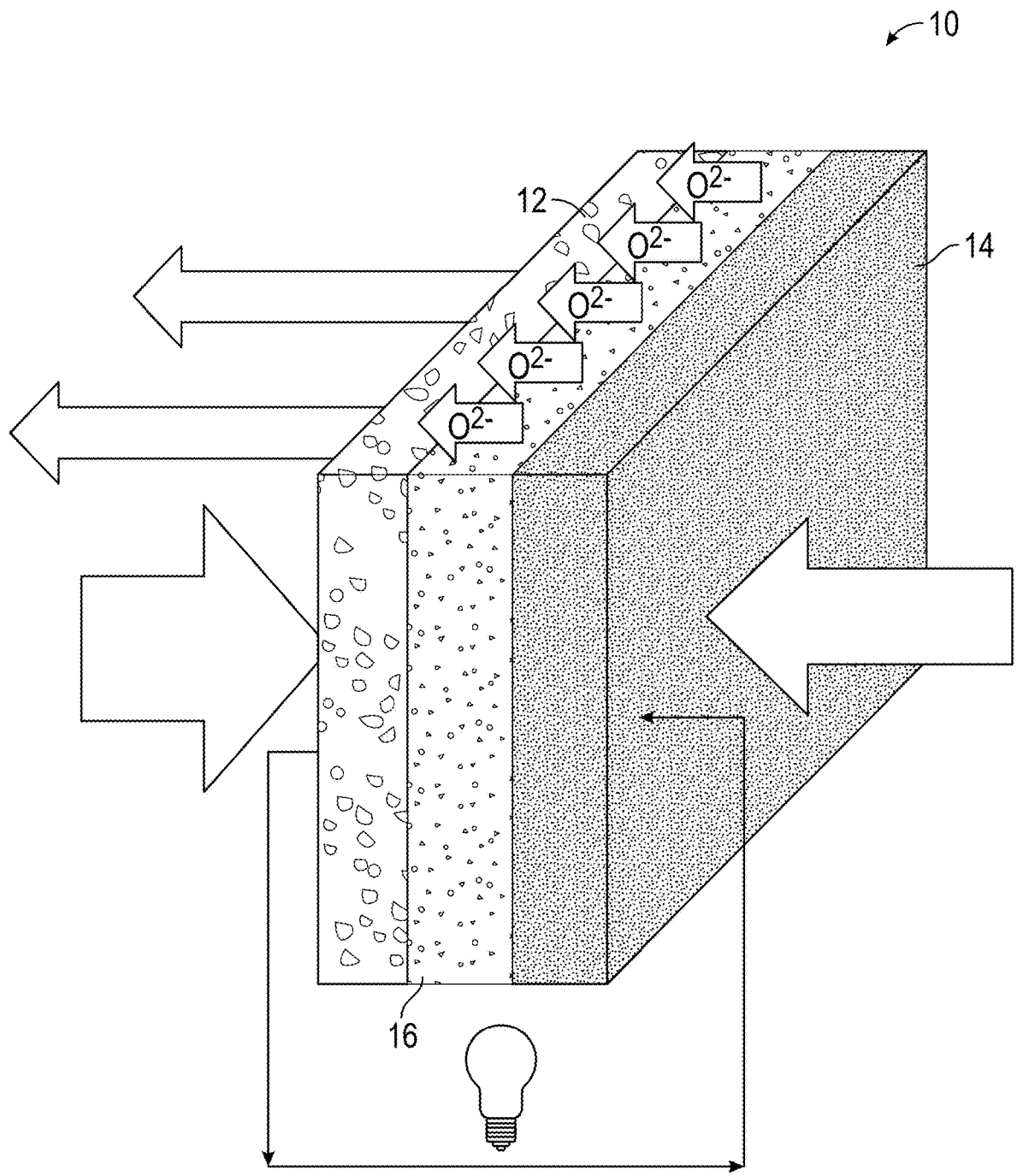
FIG. 1 is a schematic illustration of an embodiment of a solid oxide fuel cell.

Referring to FIG. 1, shown is a schematic illustration of an embodiment of a fuel cell (10). In some embodiments, the fuel cell 10 is an oxygen-ion conducting solid oxide fuel cell or a proton conducting solid oxide fuel cell. The fuel cell 10 includes an anode 12 and a cathode 14 with an electrolyte 16 disposed between the anode 12 and the cathode 14. In the case of the solid oxide fuel cell 10, the electrolyte 16 is a solid oxide material, such as for example, a ceramic material. A flow of fuel is introduced to the fuel cell 10 along with a flow of air. Chemical reactions of the fuel and air with the electrolyte 16 produces electricity. In some embodiments, an operating temperature of the fuel cell 10 is in the range of 400-900 degrees Celsius, while in other embodiments the operating temperature is in the range of 400-750 degrees Celsius. The flow of fuel may comprise, for example, natural gas, coal gas, biogas, hydrogen, or other fuels such as jet fuel.

Figure 2:
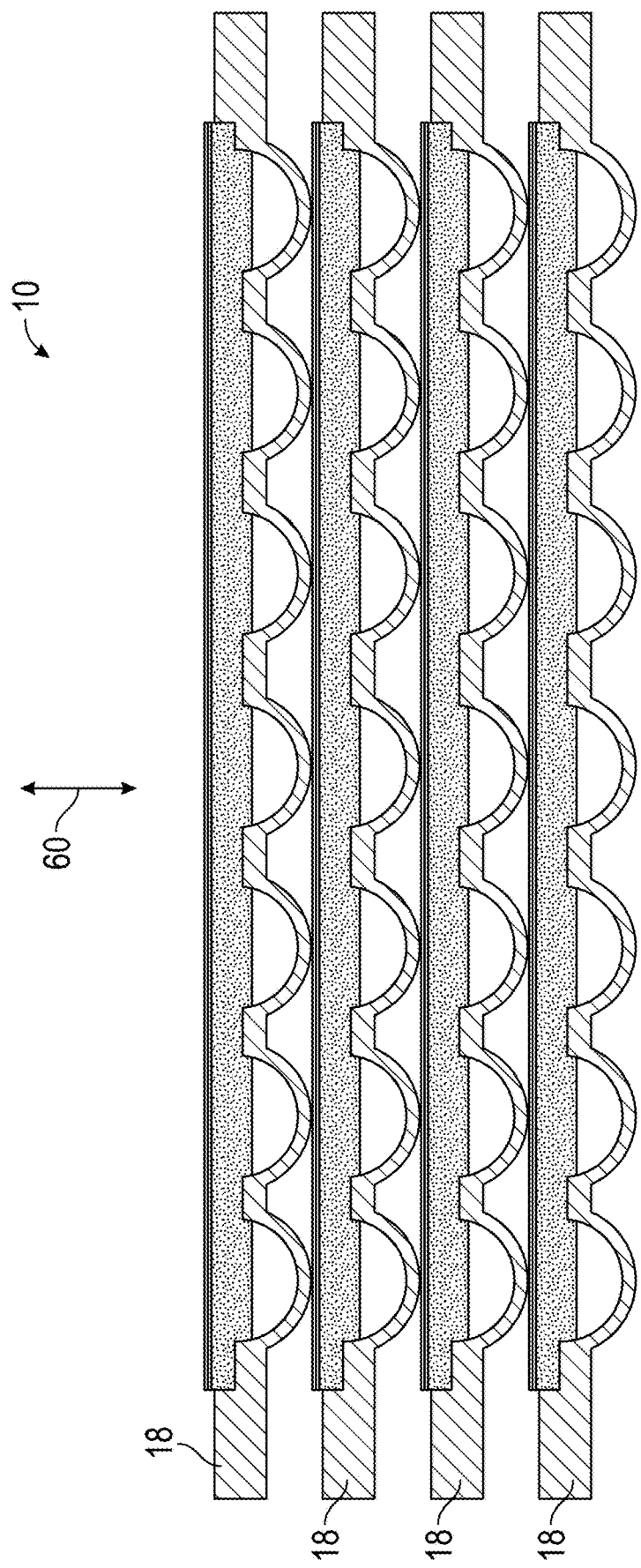
FIG. 2 is a schematic illustration of an embodiment of a fuel cell having a multilayer structure.

Referring now to FIG. 2, the fuel cell 10 includes a plurality of fuel cell layers 18 stacked along a stacking axis 60. In some embodiments, each fuel cell layer 18 has a rectangular shape. It is to be appreciated, however, that the fuel cell layers 18 may have other polygonal shapes or may be, for example, circular, elliptical or oval in shape. As shown in FIG. 3, each fuel cell layer 18 includes a separator plate 20 and a support 22 located over the separator plate 20. An anode 24, electrolyte 26 and a cathode 28 are stacked atop the support 22 in that order. In some embodiments, the electrolyte 26 is formed from a solid oxide material, such as a ceramic material. The fuel cell layers 18 are stacked such that the cathode 28 contacts the separator plate 20 of the neighboring fuel cell layer 18.

The separator plate 20 is compliant and lightweight and is shaped to define a plurality of anode flow channels 30 and a plurality of cathode flow channels 32 and separate the anode flow channels 30 from the cathode flow channels 32. The plurality of anode flow channels 30 are defined at a first side of the separator plate 20 and the plurality of cathode flow channels 32 are defined at a second side of the separator plate 20 opposite the first side. As illustrated the anode flow channels 30 and the cathode flow channels 32 at least partially overlap along the stacking axis 60. This improves a density of the fuel cell 10 along the stacking axis 60.

Compliance of the separator plate 20 ensures good contact with the cathode 28 for high electrical performance, and the separator plate 20 is configured for light weight to enable high power density of the fuel cell 10. The fuel flows through the anode flow channels 30 and the air flows through the cathode flow channels 32. When the fuel cell 10 is operated as an electrolyzer the reactant may be different. For example, for a steam electrolyzer with oxygen-ion conducting electrolyte, steam flows through the anode flow channels 30, and oxygen is generated at the cathode. For a steam electrolyzer with a proton conducting electrolyte, steam flows through the cathode flow channels 32, and hydrogen is generated at the anode.

In some embodiments, such as in FIG. 3, the separator plate 20 includes a plurality of curved portions 34 separated by flat support portions 36, with the support portions 36 interfacing with the support 22 and curved portions 34 contacting the cathode 28 of the neighboring fuel cell layer 18. The waveform shape of the separator plate 20 with the plurality of curved portions 34 allows for greater levels of fuel flow coverage to the anode 24 and a greater level of airflow coverage to the cathode 28. In other embodiments, the curved portions 34 may have other shapes, such as rectilinear as shown in FIG. 4. The separator plate 20 may be formed from corrugated sheet stock with features on the order of millimeters to centimeters. Alternatively, the separator plate 20 may be formed from sheet material by, for example, stamping, extrusion, folding, bending, roll forming, hydroforming, or the like. Other methods may include injection molding or additive manufacturing methods including laser powder bed fusion, electron beam melting, directed energy deposition, or laminated object manufacture. In still other embodiments, the separator plate may be formed at least partially by a process such as ultraviolet lithography and etching which may be used to form features with a resolution below 10 microns, or by micro-EDM (electrical discharge machining) or laser micromachining, both of which that may be utilized to produce features with a resolution in the range of 50 to 100 microns.

Figure 5:
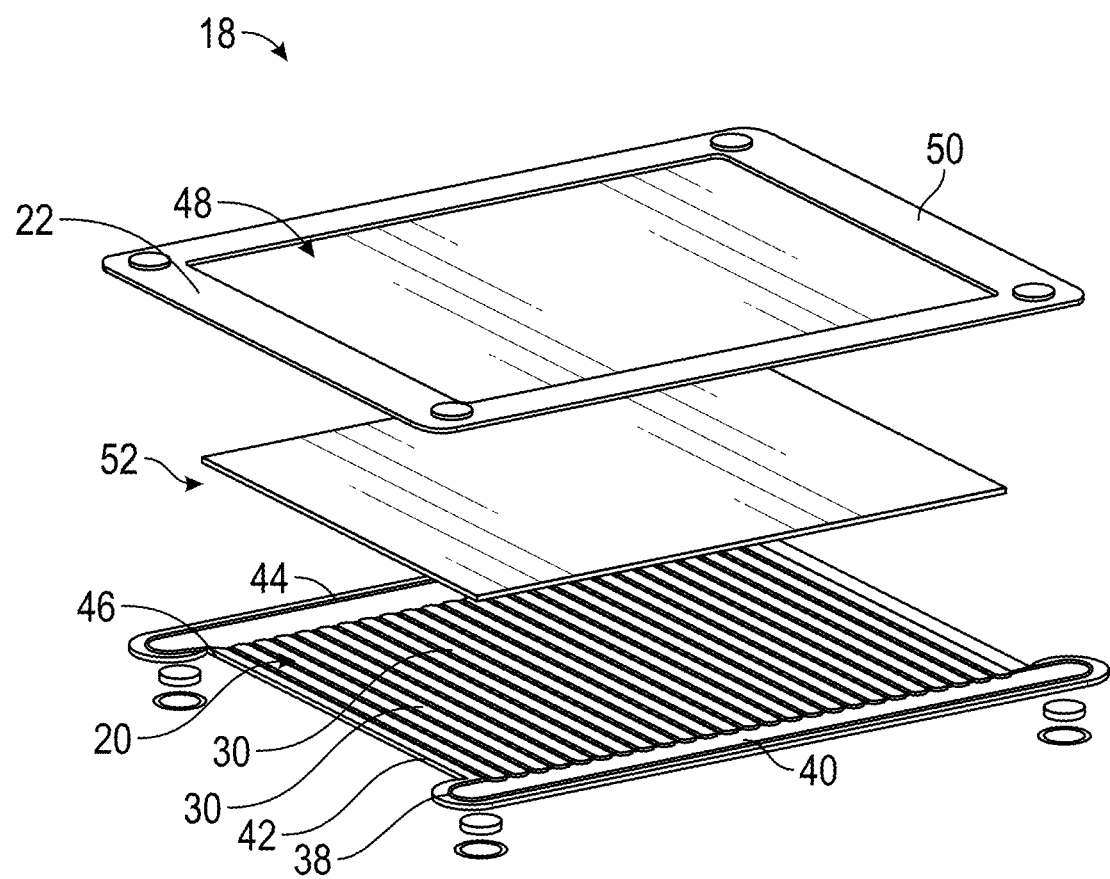
FIG. 5 is a partially exploded view of an embodiment of a fuel cell layer.

Referring again to FIG. 3 and also to the partially exploded view of FIG. 5, fuel is distributed to the anode fuel channels 30 via a primary manifold 38 and a secondary manifold 40. The primary manifold 38 extends between the fuel cell layers 18 to distribute fuel to each fuel cell layer 18 of the plurality of fuel cell layers 18. Each fuel cell layer 18 includes a secondary manifold 40 located at, for example, a first end 42 of the anode flow channels 30. The secondary manifold 40 is connected to the primary manifold 38 and the plurality of anode flow channels 30 to distribute fuel from the primary manifold 38 to each of the anode flow channels 30 of the fuel cell layer 18. The anode flow channels 30 extend from the secondary manifold 40 at the first end 42 of the anode flow channels 30 to a collection manifold 44 at a second end 46 of the anode flow channels 30. Fuel flows from the primary manifold 38 through the secondary manifold 40, and through the anode flow channels 30 with anode byproducts such as water vapor and carbon dioxide exiting the anode flow channels 30 and flowing into the collection manifold 44.

The support layer 22 is formed from a metal material in some embodiments, and includes a porous section 48 and a non-porous or solid section 50, with the solid section 50 surrounding the porous section 48 and defining an outer perimeter of the support layer 22. The porous section 48 may be formed by, for example, laser drilling of a metal sheet, sintering of metal powder, or additive manufacturing. The porous section 48 is located over the anode flow channels 30 to allow the fuel flow to reach the anode 24 through the porous section 48. In some embodiments, a metal catalyst foam layer 52 is located between the separator plate 20 and the support layer 22.

The separator plate 20 is formed from a bulk metallic glass material. The bulk metallic glass material of the separator plate 20 will have a glass transition temperature below about 600 degrees Celsius, a crystallization temperature preferably between 600 degrees and 750 degrees Celsius, and a melting temperature greater than 750 degrees Celsius. The material is desired to be electrically conductive, and available in a thin sheet less than 20 mils thick. In some embodiments, the material is less than 5 mils thick. Further, the material can have high oxidation resistance, or alternatively the separator plate 20 includes a coating to provide oxidation resistance. Example materials include Fe—Cr—Mo—C—B based bulk metallic glass materials, Zr based bulk metallic glass materials, or bulk metallic glass composites having, for example, carbon fibers or carbon nanotubes for increased electrical conductivity. In some instances, the requisite electrical conductivity may be achieved by crystallization of the bulk metallic glass.

Figure 6:
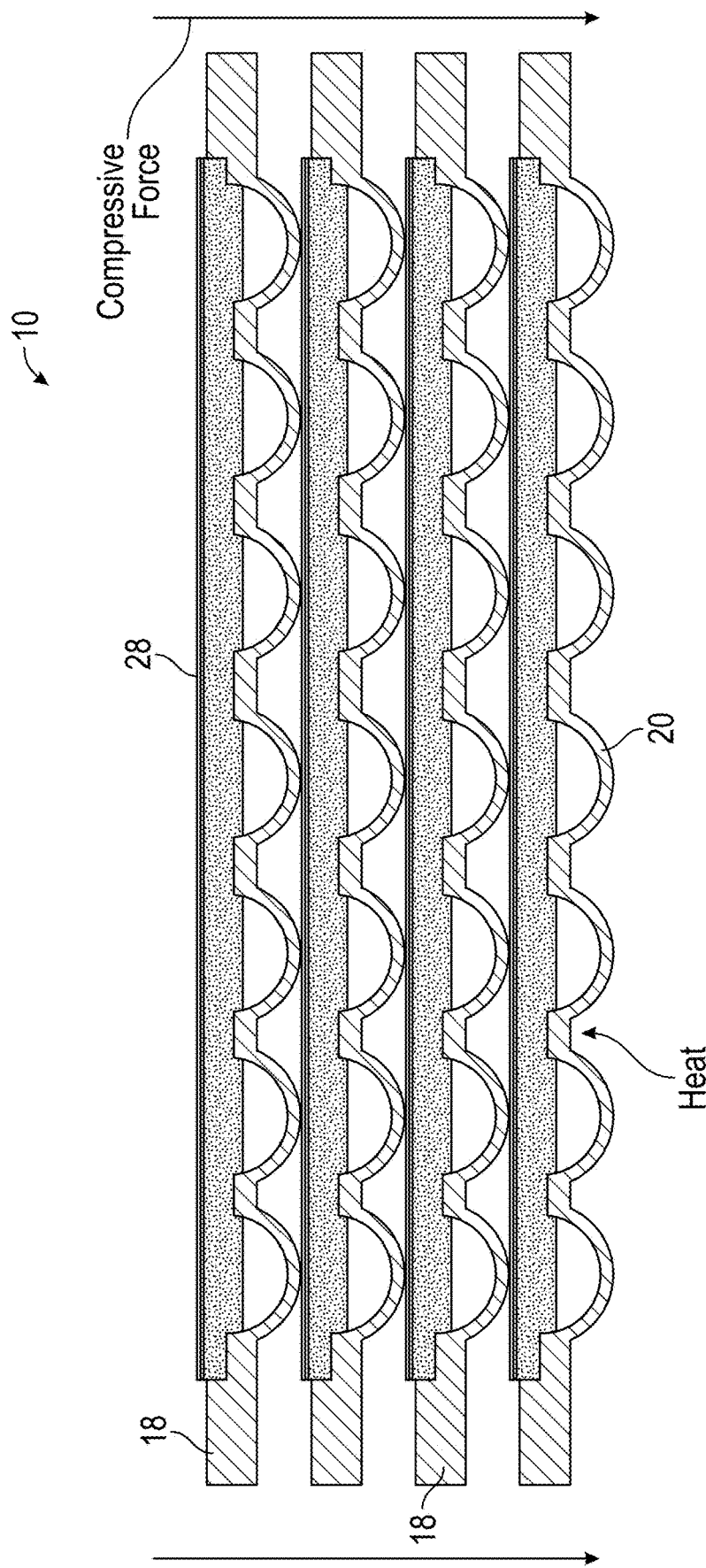
FIG. 6 partially illustrates a method of assembly of a fuel cell.
Figure 7:
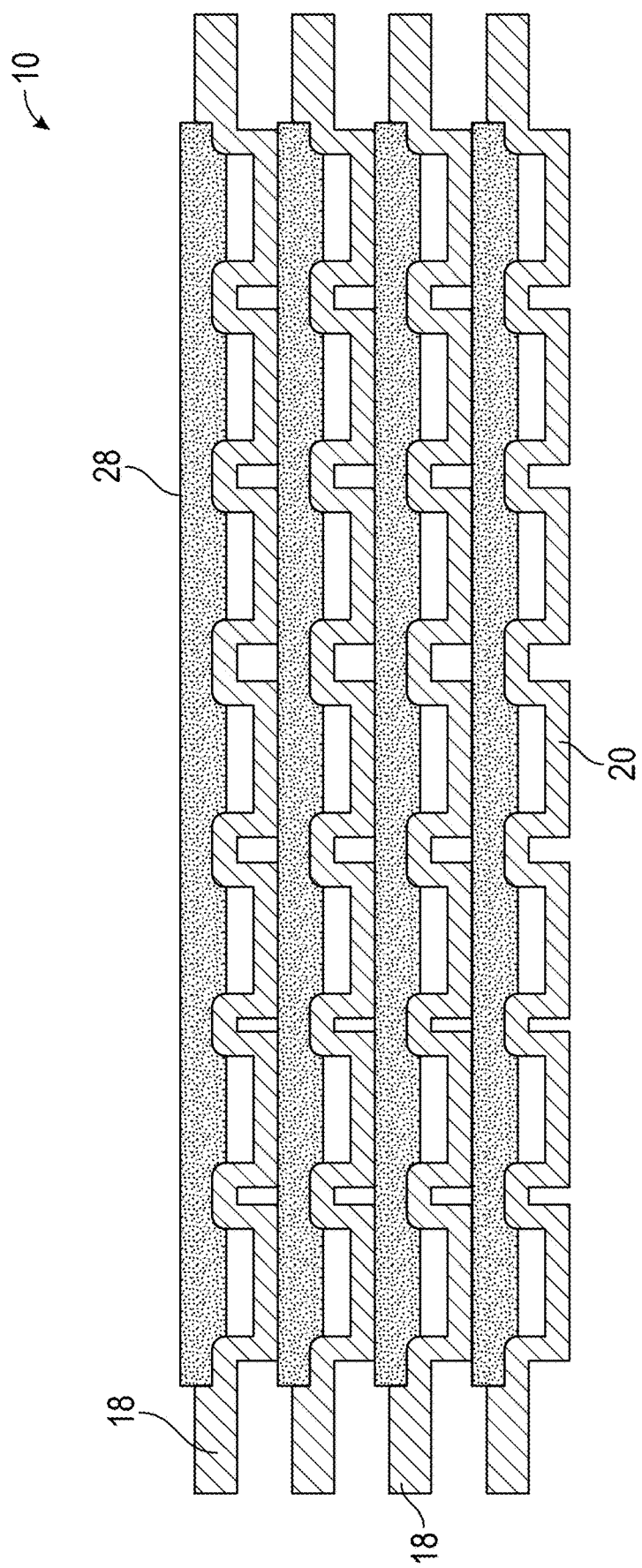
FIG. 7 partially illustrates a method of assembly of a fuel cell.

FIGS. 6 and 7 illustrate an assembly method of the fuel cell 10. As shown in FIG. 6, the fuel cell layers 18 are assembled and arranged along the stacking axis 60. The fuel cell layers 18, and more specifically the separator plates 20, are heated to above the glass transition temperature of the bulk metallic glass material of the separator plates 20. A compressive load is applied to the assembly, during which the bulk metallic glass material thermoplastically flows and conforms to the cathode 28 surface below the separator plate 20, increasing contact area of the separator plate with the cathode. Further, the separator plate 20 better conforms to the support layer 22.

Such thermoplastic forming of the separator plate 20 via the use of and heating of the bulk metallic glass material improves the interface between the separator plate 20 and the cathode 28, and further reduces the contact resistance, improving performance of the fuel cell 10. Also, the bulk metallic can fill small (sub micron) high aspect ratio cavities to bolster the contact area between the bulk metallic glass and the cathode 28. The cathode 28 may be engineered specifically for the bulk metallic glass separator plate 20. In one embodiment, the temperature may be raised after forming to crystallize the bulk metallic glass separator plate 20, thereby attaining higher conductivity.

Further, the compressive load normally required to ensure good contact between the cathode 28 and the separator plate 20 can be significantly reduced, allowing for a reduced weight of the fuel cell 10 assembly. Further, weight of the system is reduced and assembly is simplified by removing or reducing the scale of associated fixturing required.

The fuel cell 10 configurations disclosed herein enable a high performance electrical power system for, for example, an aircraft, especially for long duration operation. The configurations further reduce startup times and provide power densities higher than 500 W/kg. While the embodiments described herein apply to solid oxide fuel cells, one skilled in the art will readily appreciate that disclosed embodiments of the separator plate 20 may be applied to and utilized in other structures such as a solid oxide electrolyzer cell.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A solid oxide fuel cell or solid oxide electrolyzer, comprising:
a plurality of fuel cell layers stacked along a stacking axis, each fuel cell layer including a stacked arrangement of elements including:
a cathode;
an anode;
an electrolyte disposed between the anode and the cathode;
a support layer disposed at the anode opposite the electrolyte;
a separator plate disposed at the support layer opposite the anode, the separator plate configured to contact the cathode of an adjacent fuel cell layer of the plurality of fuel cell layers, the separator plate defining a plurality of anode flow channels configured to deliver a fuel therethrough and a plurality of cathode flow channels configured to deliver an air flow therethrough;
wherein the separator plate is formed from a bulk metallic glass material;
wherein the plurality of anode flow channels at least partially overlap the plurality of cathode flow channels in the stacking axis direction of the plurality of fuel cell layers;
wherein the separator plate includes a plurality of curved portions separated by flat support portions, with the support portions interfacing with the support layer and curved portions contacting the cathode of the adjacent fuel cell layer, each curved portion including a first curved surface and a second curved surface spaced apart from the first curved surface along the stacking axis.

2. The solid oxide fuel cell or solid oxide electrolyzer of claim 1, wherein an electrical conductivity of the separator is attained via crystallization of the bulk metallic glass material.

3. The solid oxide fuel cell or solid oxide electrolyzer of claim 1, wherein the bulk metallic glass material is corrosion resistant.

4. The solid oxide fuel cell or solid oxide electrolyzer of claim 1, wherein the separator plate comprises a coating applied to the bulk metallic glass material.

5. The solid oxide fuel cell or solid oxide electrolyzer of claim 1, wherein the electrolyte is formed from a solid oxide material.

6. The solid oxide fuel cell or solid oxide electrolyzer of claim 1, wherein the separator plate defines the plurality of anode flow channels at a first side of the separator plate and the plurality of cathode flow channels at a second side of the separator plate opposite the first side.

7. The solid oxide fuel cell or solid oxide electrolyzer of claim 1, wherein the bulk metallic glass material is one or more of a Fe—Cr—Mo—C—B based bulk metallic glass material, a Zr based bulk metallic glass material, or a bulk metallic glass composite material.

8. A fuel cell layer of a multi-layer fuel cell, comprising:
a cathode;
an anode;
an electrolyte disposed between the anode and the cathode;
a support layer disposed at the anode opposite the electrolyte;
a separator plate disposed at the support layer opposite the anode, the separator plate configured to contact the cathode of an adjacent fuel cell layer, the separator plate defining a plurality of anode flow channels configured to deliver a fuel therethrough and a plurality of cathode flow channels configured to deliver an air flow therethrough;
wherein the separator plate is formed from a bulk metallic glass material;
wherein the plurality of anode flow channels at least partially overlap the plurality of cathode flow channels in the stacking axis direction of the plurality of fuel cell layers;
wherein the separator plate includes a plurality of curved portions separated by flat support portions, with the support portions interfacing with the support layer and curved portions contacting the cathode of the adjacent fuel cell layer, each curved portion including a first curved surface and a second curved surface spaced apart from the first curved surface along the stacking axis.

9. The fuel cell layer of claim 8, wherein an electrical conductivity of the separator is attained via crystallization of the bulk metallic glass material.

10. The fuel cell layer of claim 8, wherein the bulk metallic glass material is corrosion resistant.

11. The fuel cell layer of claim 8, wherein the separator plate comprises a coating applied to the bulk metallic glass material.

12. The fuel cell layer of claim 8, wherein the separator plate defines the plurality of anode flow channels at a first side of the separator plate and the plurality of cathode flow channels at a second side of the separator plate opposite the first side.

13. The fuel cell layer of claim 8, wherein the bulk metallic glass material is one or more of a Fe—Cr—Mo—C—B based bulk metallic glass material, a Zr based bulk metallic glass material, or a bulk metallic glass composite material.

14. A method of assembling a multi-layer fuel cell, comprising:
assembling a plurality of fuel cell layers, each fuel cell layer including:
a cathode;
an anode;
an electrolyte disposed between the anode and the cathode;
a support layer disposed at the anode opposite the electrolyte;
a separator plate disposed at the support layer opposite the anode, the separator plate configured to contact the cathode of an adjacent fuel cell layer, the separator plate defining a plurality of anode flow channels configured to deliver a fuel therethrough and a plurality of cathode flow channels configured to deliver an air flow therethrough;
wherein the separator plate is formed from a bulk metallic glass material;
wherein the plurality of anode flow channels at least partially overlap and the plurality of cathode flow channels in the stacking axis direction of the plurality of fuel cell layers;
arranging the plurality of fuel cell layers along a stacking axis;
heating the separator plate to a temperature greater than a glass transition temperature of the bulk metallic glass material;
applying a compressive load to the plurality of fuel cell layers; and
allowing the bulk metallic glass material to thermoplastically flow thereby increasing a contact area of the separator plate to the cathode of the adjacent fuel cell layer;
wherein the separator plate includes a plurality of curved portions separated by flat support portions, with the support portions interfacing with the support layer and curved portions contacting the cathode of the adjacent fuel cell layer, each curved portion including a first curved surface and a second curved surface spaced apart from the first curved surface along the stacking axis.

15. The method of claim 14, wherein the bulk metallic glass material is one of a Fe—Cr—Mo—C—B based bulk metallic glass material, a Zr based bulk metallic glass material, or a bulk metallic glass composite.

16. The method of claim 14, wherein the glass transition temperature is below 600 degrees Celsius.

17. The method of claim 14, wherein thermoplastic flow of the bulk metallic glass material improves a contact area between the separator plate and the support layer.

18. The solid oxide fuel cell or solid oxide electrolyzer of claim 1, wherein the flow through the plurality of anode flow channels is parallel to the flow through the plurality of cathode flow channels.

* * * * *